United States Patent
Schalk

[19]
[11] Patent Number: 5,901,945
[45] Date of Patent: *May 11, 1999

[54] TWO-WAY VALVE FOR PIPELINES

[75] Inventor: Adelbert Schalk, Wutoschingen-Horheim, Germany

[73] Assignee: Georg Fischer Rohrleitungssysteme, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/802,023

[22] Filed: Feb. 18, 1997

[30] Foreign Application Priority Data

Feb. 16, 1996 [CH] Switzerland ............... 00408/96

[51] Int. Cl.$^6$ ............................................. F16K 5/00
[52] U.S. Cl. .................................. 251/309; 251/317.01
[58] Field of Search .................................. 251/309, 312, 251/317.01

[56] References Cited

U.S. PATENT DOCUMENTS

| 3,133,723 | 5/1964 | Goldman et al. | 251/309 |
| 4,031,918 | 6/1977 | Cagle | 251/309 X |
| 4,339,110 | 7/1982 | Ortega | 251/312 X |
| 4,511,120 | 4/1985 | Conley et al. | 251/312 X |
| 4,697,786 | 10/1987 | Kennedy | 251/312 X |

*Primary Examiner*—John Fox
*Attorney, Agent, or Firm*—Gifford, Krass, Groh, Sprinkle, Anderson & Citkowski, P.C.

[57] ABSTRACT

A two-way valve 10 for pipelines comprises a valve housing 12 with connection pieces 14 and a valve body 16 that is arranged in the valve housing an actuated via an adjusting lever 42. The valve body has a flow-through bore that forms a tubular flow-through channel for a fluid with the connection pieces 14 in the open position of the valve. The valve body 16 comprises a cylindrical sealing surface that forms a fluid-tight, close fit with a cylindrical inner wall of the valve housing 12.

5 Claims, 1 Drawing Sheet

TWO-WAY VALVE FOR PIPELINES

FIELD OF THE INVENTION

The invention pertains to a two-way valve for pipelines which comprises a valve housing with connection pieces and a valve body that is arranged in the valve housing and actuated via an adjusting lever, with the valve body having a flow-through bore that forms a tubular flow-through channel for a fluid with the connection pieces in the open position of the valve.

BACKGROUND OF THE INVENTION

Flow regulators of the initially mentioned type are known in the field of pipeline construction as ball valves. A ball valve consists of several components and is correspondingly expensive to manufacture.

SUMMARY OF THE INVENTION

In light of these circumstances, the invention is based on the objective of developing a two-way valve of the initially mentioned type which comprises less components than conventional ball valves, allows a simple assembly and can be inexpensively manufactured.

According to the invention, the valve body has a cylindrical surface that forms a fluid-tight, close fit with a cylindrical inner wall of the valve housing.

The cylindrical surface according to the invention makes it possible to manufacture a valve that consists of only two individual components and can be easily assembled by simply inserting the valve body into the valve housing.

In order to improve the fluid-tightness, a groove for a seal may be arranged in the cylindrical surface and/or in the cylindrical inner wall. In one preferred embodiment of the two-way valve according to the invention, this groove or seal extends continuously along both edges of the cylindrical surface and encompasses both openings of the flow-through bore. It is of course, also possible to arrange one respective circumferential seal within the region of both edges of the cylindrical surface.

The valve housing preferably comprises an annular surface with two protruding cams. A limit stop cam that protrudes from the valve body beyond the cylindrical surface lies between the cams on the annular service. The cams that serve as the limit stops for the limit stop cams are arranged in accordance with the end positions of the valve.

In order to attain a better support for the valve body, a bearing part that engages into an opening in the base of the valve housing which serves as a bearing busing may be integrally formed onto the valve body. The bearing part may extend through this opening and be held in the valve housing, e.g., by means of hot upsetting, so as to secure the valve body in the valve housing.

The two-way valve according to the invention is preferably manufactured of plastic and intended for use in irrigation systems. Suitable plastics are, for example, PE, PVC, PP, PVDF as well as other plastic materials used for pipeline systems.

Additional advantages, characteristics and details of the invention are described below the reference to one preferred embodiment as well as the drawing; shown schematically are:

DETAILED DESCRIPTION OF THE PREFERRED EMBODIMENT

Figure 1:
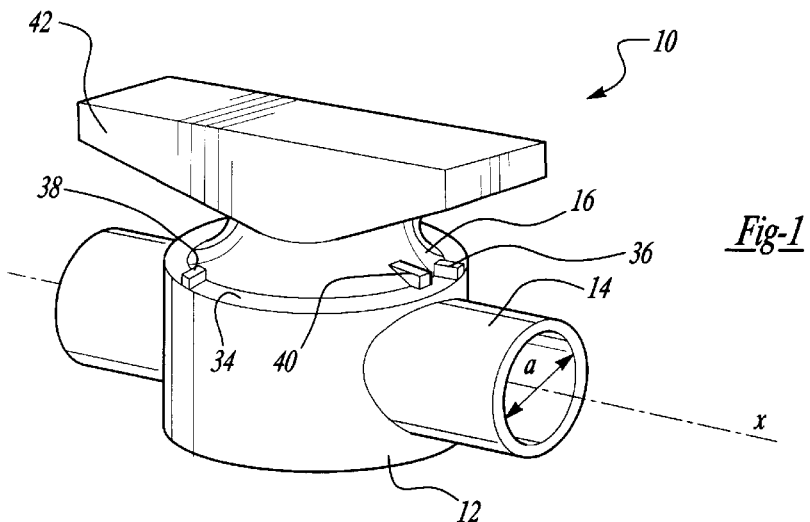
FIG. 1, an oblique view of a two-way valve for pipelines.
Figure 2:
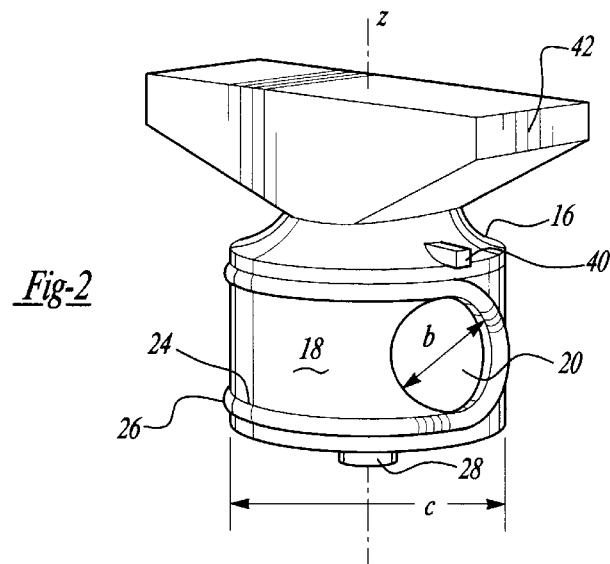
FIG. 2, a side view of the valve body of the two-way valve shown in FIG. 1.
Figure 3:
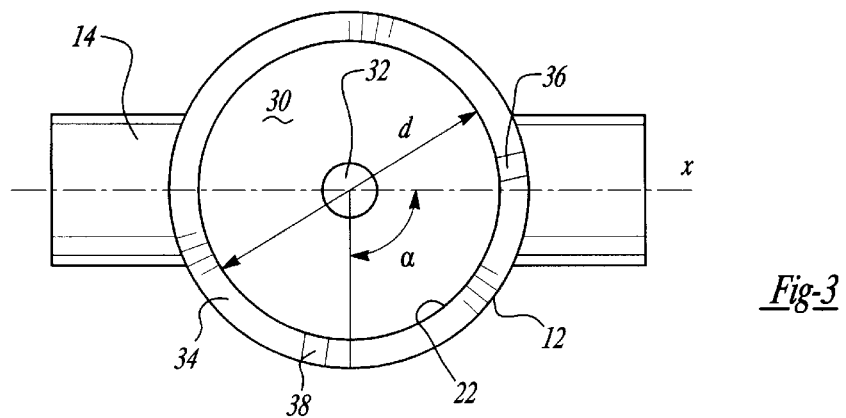
FIG. 3, a top view of the housing of the two-way valve shown in FIG. 1.

A two-way valve 10 for a pipeline, which for reasons of better intelligibility, is not illustrated in detail in the figures comprises a tubular valve housing 12 with connection pieces 14 that are integrally formed onto the valve housing diametrically opposite to one another and serve for the installation into a pipeline. A valve body 16 with a cylindrical surface 18 is situated in the valve housing 12. This cylindrical surface adjoins a cylindrical inner wall 22 of the valve housing 12 in fluid-tight manner. An additional sealing effect between the valve housing 12 and the valve body 16 is attained with a seal 26 that is inserted into a groove 24 in the sealing surface 18. The continuous seal 26 extends along both edges of the sealing surface 18 and encompasses both openings of a flow-through bore 20.

A bearing part 28 is integrally formed onto the valve body 16 concentric to its axis of rotation z. Once the valve body 16 is inserted into the valve housing 12, this bearing part engages into an opening 32 in the base 30 of the valve housing 12 which serves as a bearing bushing. An adjusting lever 42 is integrally formed onto the end of the valve body 16 which is situated opposite the bearing part 28 in such a way that the adjusting lever is always situated analogously to the flow, i.e., a very good visual control of the open or closed position is attained.

The end surface of the valve housing 12 which faces the adjusting lever 42 is realized in the form of an annular surface 34. Two cams 36, 38 protrude from the annular surface 34. A limit stop cam 40 protrudes from the end surface of the valve body 16 which faces the adjusting lever 42 radially to the axis of rotation z of the valve, with said limit stop cam protruding beyond the cylindrical surface 18 and lying between the two cams 36, 38 of the annular surface 34 when the valve body 16 is inserted into the valve housing 12. The two end positions of the limit stop cam 40 on the respective cams 36, 38 correspond to the open position and the closed position of the two-way valve 10.

The diameter c of the valve body 16 or the cylindrical surface 18, respectively, essentially corresponds to the diameter of the cylindrical inner wall d, i.e., the valve housing 12 and the valve body 16 form a tight fit. The inner diameter b of the flow-through bore 20 corresponds to the inner diameter of the connection pieces 14 such that a tubular flow channel with the pipe axis x is formed in the open position of the two-way valve 10.

The connection pieces 14 shown in the figure which serve for the installation into a pipeline can be modified for different connection methods. For example, the connection pieces may be provided with a thread and connected to the pipeline by means of a union nut.

I claim:

1. A two-way valve for a pipeline, comprising:
 a valve housing (12) with connection pieces (14) for interconnecting the valve with the pipeline, the valve housing having a cylindrical inner wall;
 a valve body (16) arranged in the valve housing, the valve body having a cylindrical surface (18) that forms a close fit with the cylindrical inner wall of the housing, the cylindrical surface having an upper and a lower edge, the valve body having an adjusting lever (42) for actuating the valve body, the valve body further having a flow-through bore (20) defined therein, the bore extending from a first opening in the cylindrical surface to an opposed second opening in the cylindrical surface, each of said openings having a first side and a second side, the bore (20) together with the connection pieces (14) forming a tubular flow-through channel for a fluid when the valve body is in an open position; and a seal (26) consisting of a pair of ends interconnected by a pair of sides, said seal supported on the cylindrical surface (18) of the valve body (16) with said side portions extending substantially parallel with each other and substantially perpendicular to the axis of said valve body, said seal extending adjacent the lower edge of the surface from the first opening to the second opening and then arcuately around the first side of the second opening and then adjacent the upper edge of the surface back to the first opening and then arcuately around the second side of the first opening to rejoin itself, whereby the seal is adjacent only a portion of each of said openings.

2. A two-way valve according to claim 1, wherein a groove (24) for the seal (26) is arranged in the cylindrical surface 18 of the valve body (16).

3. A two way valve according to claim 1, wherein the valve housing (12) further includes an annular surface (34) with two protruding cams (36, 38), and the valve body further includes a limit stop cam (40) extending from the cylindrical surface (18) so that the limit stop cam (40) lies between the protruding cams (36, 38) adjacent the annular surface (34).

4. A two-way valve according to claim 1, wherein the valve housing further includes a base (30) with an opening (32) formed therein, and the valve body further includes an integrally formed bearing part (28) configured for engaging the opening (32), the opening serving as a bearing bushing.

5. A two-way valve according to claim 1, further comprising a groove defined in the cylindrical inner wall of the valve housing, said groove positioned so as to guide said seal.

* * * * *